(12) United States Patent
Stafford

(10) Patent No.: US 10,444,704 B2
(45) Date of Patent: Oct. 15, 2019

(54) DYNAMIC DISPLAY USING HOLOGRAPHIC RECORDED PIXELS

(71) Applicant: Sony Interactive Entertainment Inc., Tokyo (JP)

(72) Inventor: Jeffrey R. Stafford, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/299,836

(22) Filed: Oct. 21, 2016

(65) Prior Publication Data

US 2018/0113419 A1 Apr. 26, 2018

(51) Int. Cl.
*G03H 1/02* (2006.01)
*G03H 1/30* (2006.01)
*G02B 27/01* (2006.01)

(52) U.S. Cl.
CPC ............ *G03H 1/30* (2013.01); *G02B 27/0172* (2013.01); *G03H 1/02* (2013.01); *G02B 2027/0174* (2013.01); *G02B 2027/0178* (2013.01); *G03H 2001/026* (2013.01); *G03H 2222/18* (2013.01); *G03H 2222/34* (2013.01); *G03H 2222/36* (2013.01); *G03H 2223/12* (2013.01); *G03H 2223/22* (2013.01)

(58) Field of Classification Search
CPC .................................... G03H 1/22; G03H 1/26
USPC ................. 359/15, 22, 24, 25, 32, 33; 345/8
See application file for complete search history.

(56) References Cited

U.S. PATENT DOCUMENTS

| | | | |
|---|---|---|---|
| 4,655,542 A | 4/1987 | Dube | |
| 5,687,012 A * | 11/1997 | Kang | G03H 1/041 283/86 |
| 5,949,559 A * | 9/1999 | Kihara | G03H 1/02 359/22 |
| 2005/0134948 A1 | 6/2005 | Waldman et al. | |
| 2006/0275670 A1 | 12/2006 | Riley et al. | |
| 2009/0219595 A1* | 9/2009 | Olaya | G03H 1/02 359/25 |
| 2010/0149073 A1* | 6/2010 | Chaum | G02B 27/0093 345/8 |
| 2012/0002257 A1 | 1/2012 | Shirakura et al. | |
| 2016/0033771 A1 | 2/2016 | Tremblay et al. | |
| 2016/0037146 A1 | 2/2016 | McGrew | |
| 2016/0253835 A1 | 9/2016 | Conness et al. | |
| 2016/0274450 A1 | 9/2016 | Usukura et al. | |

FOREIGN PATENT DOCUMENTS

GB 1472622 A 5/1977

* cited by examiner

*Primary Examiner* — Audrey Y Chang
(74) *Attorney, Agent, or Firm* — John L. Rogitz

(57) ABSTRACT

A holographic film is encoded on a pixel-by-pixel basis by sequentially irradiating each pixel using a movable laser that directs light against a suitable object that in turn deflects the light toward the film. The film can then be used as a display for playing back demanded images using a laser or in some cases LEDs to irradiate each pixel on a pixel-by-pixel basis according to the demanded image.

10 Claims, 12 Drawing Sheets

Playback

DYNAMIC DISPLAY USING HOLOGRAPHIC RECORDED PIXELS

FIELD

The application relates generally to dynamic displays using holographic recorded pixels.

BACKGROUND

An example holographic film contains a silver halide emulsion in which small particles are suspended in a three dimensional matrix. Laser light impinging on the film moves the particles such that a hologram is created in the film. A hologram essentially records information regarding light from a 3D object as scattered in multiple directions rather than from only one direction, as in a photograph. This allows the hologram of the object to be viewed from multiple angles with different object aspects, just as the original object can be viewed from multiple angles to see it various aspects.

Thus, a hologram records the interference wavefront patterns of light from a reference source (typically from a laser) and the reflections off an object from the reference source. A hologram can record the correct focus cues and polarization of light. Photographic film records the holographic interference patterns by displacing the tiny silver-halide particles in the film, which are typically between 0.1 to 2 micro meters in diameter. Photographic film can record at least 800 line pairs per mm, which is equivalent to over 20,000 dots per inch (DPI), thus allowing film to achieve at least 100× greater resolution than typical electronic displays.

SUMMARY

Present principles understand that holographic film can be used to establish a dynamic display for producing demanded images.

A system records a hologram of a "pixel" array like a display. The "pixels" in this case can be objects reflecting light from the laser light onto the holographic film and can be any suitable object. For example, a display could have pixels created from PlayStation® symbols, 3D blocks, or just plain 2D squares of light like a regular display's pixels.

A mechanized system can move a laser source and a "pixel" object reflector such that for each "pixel" laser light reflects off the object to a small patch on the holographic film. This can be achieved with masking the laser source and/or the holographic film to only expose a tiny portion where a holographic pixel is to appear. Then the system moves the laser light source and the pixel object to the next position for next "pixel" and exposes again. This process repeats until a 1D, 2D or even a 3D array of pixels (by way of multiple 2D array exposures) has been created.

Playback of the display includes repositioning a dynamically switchable laser across the same path as the recording phase, at a very high speed. The playback laser light can be masked to only light up the area of the holographic film where the "pixel" was recorded to reduce cross-talk with other "pixel" areas. In addition to using simple light masks and shields, a dynamic polarization filter can be used for "pixel" selection into the hologram. Using this method a scanning holographic pixel display can realized that can display a 2D or 3D image constructed from smaller parts ("pixel objects") that does not exhibit the vergence and accommodation conflict as seen with traditional displays seen under fixed optics, as the eyes are converging and focusing on the same point in the image. This type of display can be used for near to eye applications like virtual reality (VR) and augmented reality (AR) in head mounted displays.

Accordingly, a method includes directing light from a laser onto at least one reflector, and allowing reflections of the light from the reflector to impinge on substantially only a first pixel region of N pixel regions on a holographic film. The method also includes modifying at least one characteristic of the laser (such as moving the laser), directing light from the laser onto at least one reflector, and allowing reflections of the light from the reflector to impinge on substantially only a second pixel region of the N pixel regions on a holographic film. The method continues to expose pixel regions of the N pixel regions one at a time to laser light reflected from at least one reflector while modifying at least one characteristic of the laser between successive exposures of the pixel regions.

The laser characteristic can include one or more of: a position, orientation, polarization, of the laser.

In example embodiments, the directing step can include masking all pixel regions from the light except for a pixel region being exposed to reflections of laser light from the reflector. The method may further include disposing the film in a virtual reality or augmented reality headset as a replacement for existing display and optics.

In some implementations, the at least one reflector is used to sequentially expose at least the first and second pixel regions, with the reflector being moved between exposures of the first and second pixel regions. In other implementations, the at least one reflector includes an array of reflectors, and the method includes exposing the first and second pixel regions to reflections from respective first and second reflectors in the array.

If desired, the method can include closely juxtaposing an array of static polarization regions with the film prior to directing light from the laser onto the film. The method may further include passing light from the laser through a dynamic polarizer.

In another aspect, a display with holographically recorded pixels includes at least one holographic film, an array of holographically recorded pixels in the film, and a dynamic illuminator positioned to illuminate individual ones of the pixels simultaneously or in temporal sequence according to a demanded image input to the dynamic illuminator. The dynamic illuminator may be implemented by, e.g., a scanning laser or one or more scanning light emitting diodes (LED). In yet another implementation, the dynamic illuminator can include an array of individual illuminators such as individual lasers or an array of individual LEDs or an array of individual lasers and LEDs directing their light to match respective pixel regions on the film. In yet another aspect, the dynamic illuminator may be implemented by a single light emitter and a dynamic reflective array, e.g. a laser and a liquid crystal on silicon (LCOS) reflective display. Thus, the dynamic illuminator may include an illuminating laser and a dynamic array of reflective or diffraction elements. The dynamic array of reflective or diffraction elements may be established by a liquid crystal on silicon (LCOS) reflective display or a LCOS transmissive display.

In another aspect, a method includes receiving signals representing a demanded image, and directing light onto holographic film having holographically recorded pixels one pixel at a time such that perceptible reflections of the light from the film establish a presentation in accordance with the demanded image.

In another aspect, a method includes providing at least one holographic film, and establishing an array of holographically recorded pixels in the film.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturers of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Figure 1:
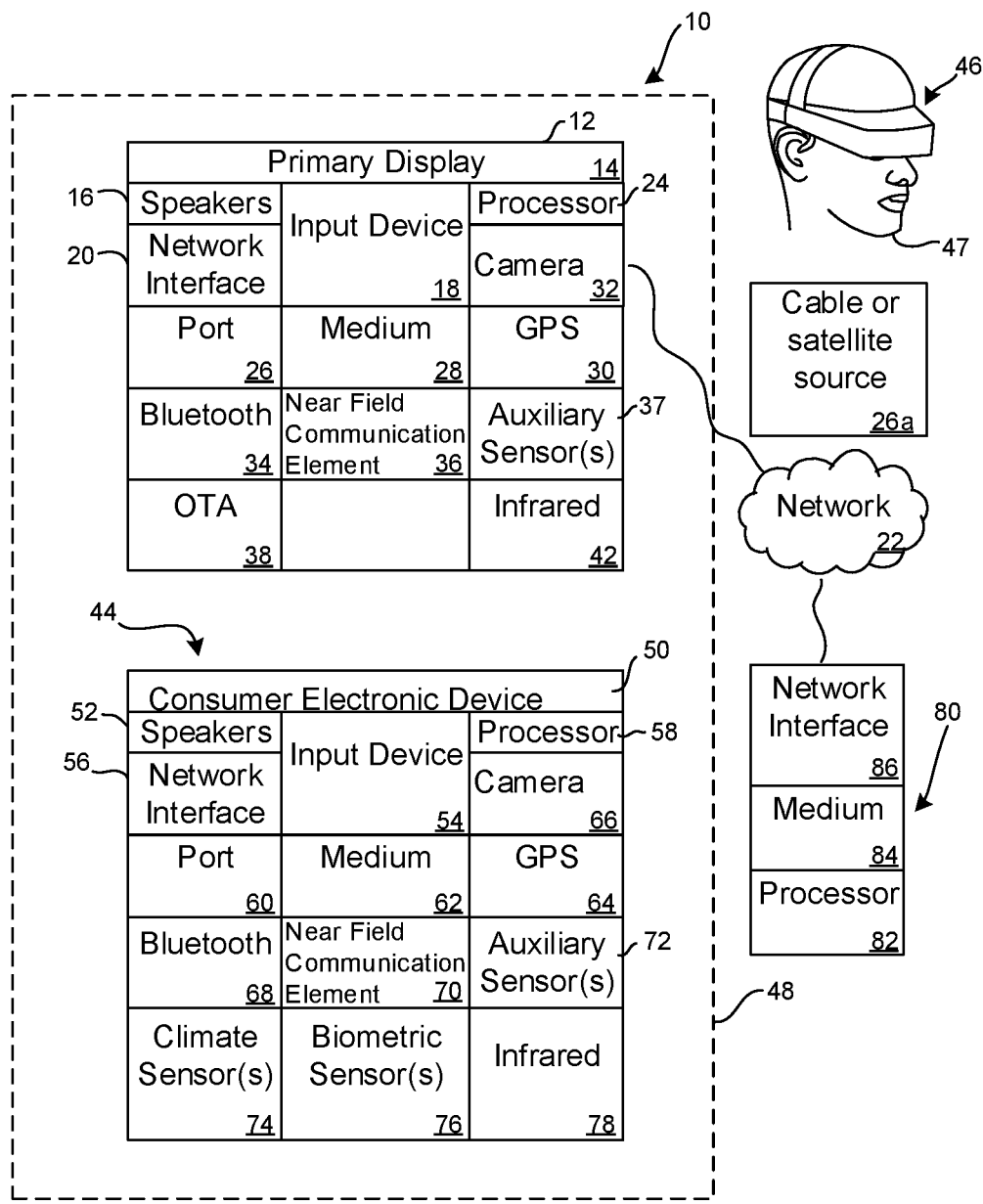
FIG. 1 is a block diagram of an example system in accordance with present principles.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members. FIG. 1 described below provides example components that may be used herein in the appropriate combinations.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Figure 2:
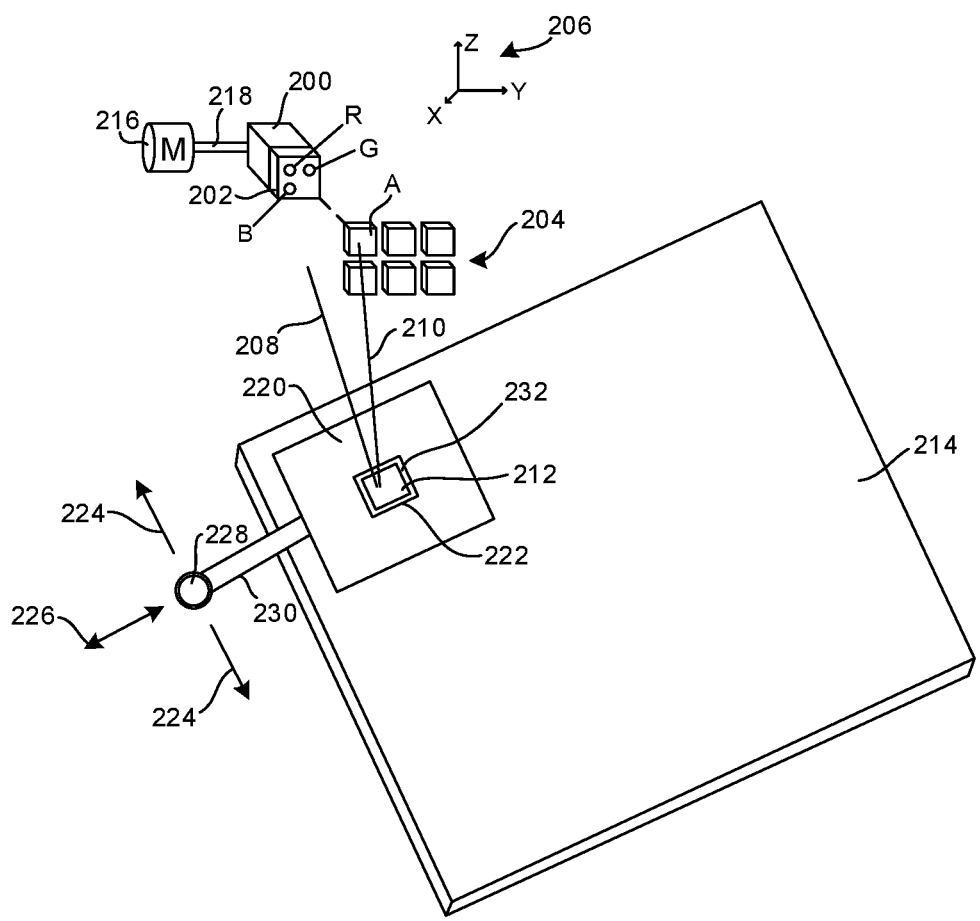
FIG. 2 is a schematic diagram of a first architecture for encoding pixels on a holographic film.

FIG. 2 illustrates an encoding system that includes one or more encoding laser assemblies 200 that may emit light through one or more adjustable polarizers 202 onto a selected reflector A in an array 204 of reflectors. Each reflector may deflect light including by way of internal reflection or refraction. In the example shown the array 204 is a two dimensional array but could be a three dimensional array as shown by the x-y-z axes 206. Reference light 208 from the encoding laser 200 that does not impinge on a reflector can interfere with object light 210 that passes through a reflector, with the resulting interference pattern being encoded in a region 212 of a holographic film 214. Once illumination of a first reflector "A" is encoded onto the region 212 of the film 214, a motor 216 that is coupled to the encoding laser 200 by a mechanism 218 (such as a gimbal, servo, rail, rack-and-pinion, etc.) can be activated to move the encoding laser assembly 200 to illuminate another one of the reflectors in the array, If desired, nearby regions of the film 214 that are not to be illuminated for a particular location of the encoding laser 200 can be masked by, for example, a movable physical mask 220 with a single opening 222 placed over the region sought to be illuminated and with a mask substrate blocking light from other regions, to reduce cross-talk. In the example shown, the mask 220 is moved in two dimensions represented by the arrows 224, 226 by a motor 228 that is coupled to the mask 220 by a mechanism 230 such as any of the example mechanisms noted above. Various other mechanisms can be utilized for masking the exposure for the areas outside of region 212, including but not limited to a LCD polarizing screen and other forms of dynamic light blocking schemes. A polarization filter 232 may be disposed in the opening 222 if desired.

Furthermore, reflectors that are not to be illuminated for a particular location of the encoding laser 12 can also be masked by, for example, a second movable physical mask (not shown for clarity) with a single opening placed over the reflector sought to be illuminated and with a mask substrate that blocks light from other reflectors.

Note that the polarization filters herein may be altered spatially for the hologram recoding to reduce cross-talk with neighboring encoding areas on the holographic film. The polarization can be dynamic by using an electronically controlled spatial light modulator in addition to or in lieu of the polarizer 202.

While FIG. 1 shows a transmissive system that requires the playback illuminator described further below to be one or more lasers, a reflective arrangement may be used, in which case the playback illuminator can be one or more light emitting diodes (LED) or one or more playback lasers.

Note that a preferred implementation of the laser assembly 200 may include red, green and blue light-emitting lasers R, G, B. While the lasers R, G, B are shown in a single assembly, it is to be understood that they may be implemented in separate assemblies. Each of the R, G, and B lasers may illuminate each region of the film 214.

Figure 3:
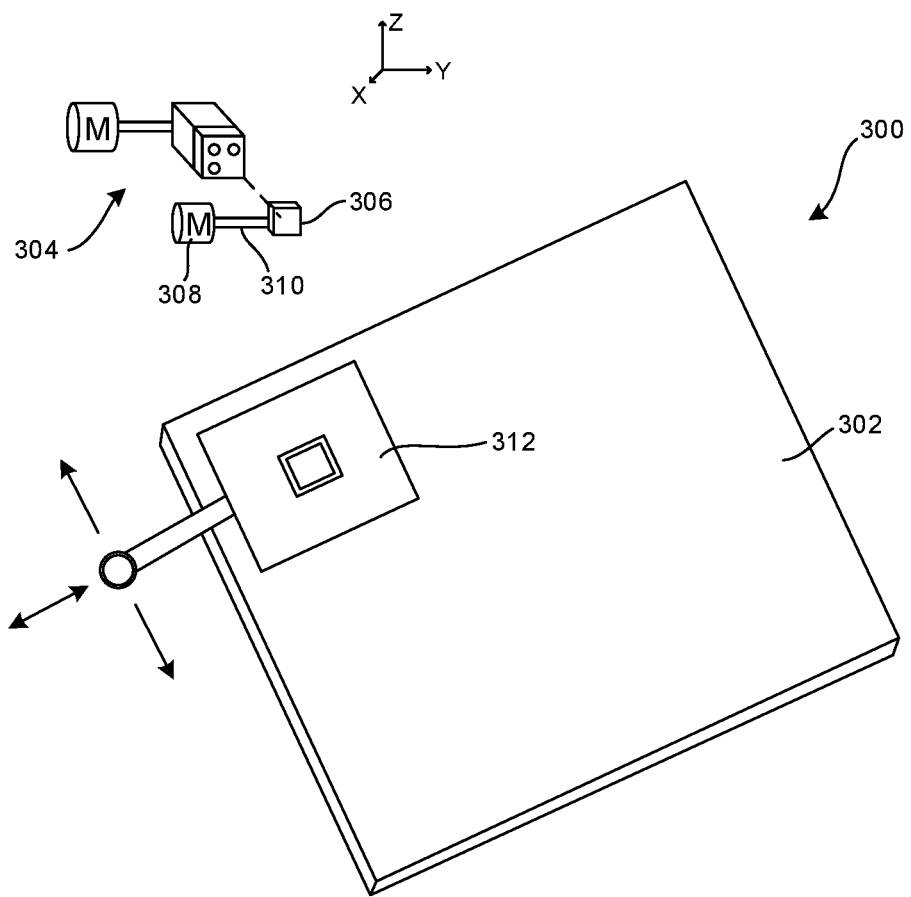
FIG. 3 is a schematic diagram of a second architecture for encoding pixels on a holographic film.

FIG. 3 shows an encoding system 300 for encoding holographic film 302 using an encoding laser assembly 304 that in substantial part is identical in configuration and operation to the system shown in FIG. 2, with the following exception. Instead of an array of reflectors, a single reflector 306 may be used and may be moved from location to location corresponding to film region to film region to be encoded, essentially replacing the array of reflectors shown in FIG. 2 with a single reflector that is moved in sequence into each location that the individual reflectors in FIG. 2 would otherwise occupy. A motor 308 can be engaged with the reflector 306 by a coupling 310 that may be implemented according to disclosure above to move the reflector 306 in one, two, or three dimensions as desired, with the encoding assembly 304 being actuated at each reflector location to encode a respective region of the film 302. As was the case in FIG. 2, in FIG. 3 a movable mask 312 with optional polarization filter can be used to mask regions of the film other than the region currently being encoded.

Figure 4:
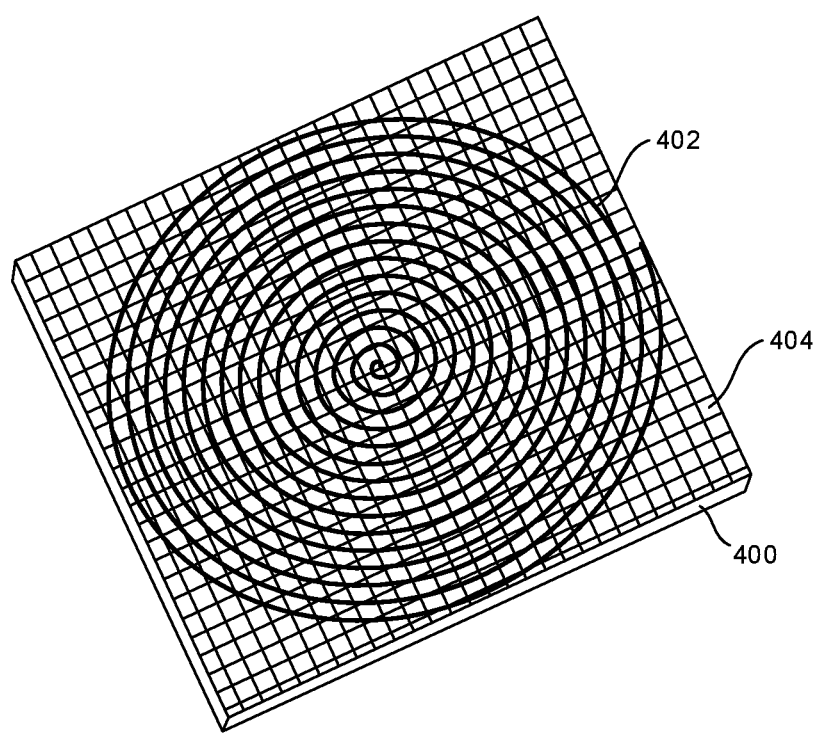
FIG. 4 is a schematic diagram of a third architecture for encoding pixels on a holographic film.

FIG. 4 shows that in yet another implementation, a holographic film 400 can be encoded substantially as a whole using a single holographic image 402. That is, instead of encoding each individual "pixel" region and then moving on to the next region and so forth as in FIGS. 2 and 3, in FIG. 4 the entire film is exposed at once to a single image 402. Then, the film is divided into a grid 404, with the "pixel" regions being defined between the lines of the grid. This may be undertaken using, e.g., laser etching to establish the grid 404. Or, the film can be cut along the grid lines to physically separate the pixel regions, with the regions then reassembled onto a substrate to establish the grid formation shown, with small gaps between adjacent pixels. As understood herein, when a holographic image is thus divided, each division assumes the characteristic of the entire original image, albeit smaller in size than the original.

Figure 5:
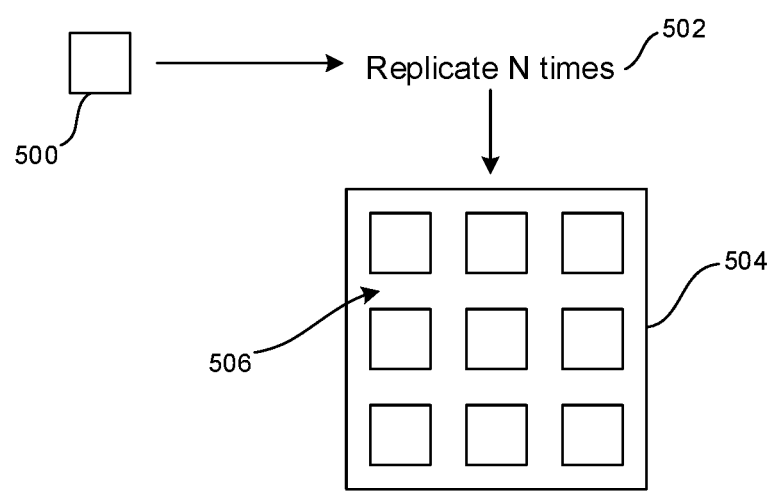
FIG. 5 is a schematic diagram of a fourth architecture for encoding pixels on a holographic film.

FIG. 5 shows yet another implementation in which a single small region 500 of holographic film is encoded using a laser with a holographic image, and then replicated 502 "N" times. The "N" replications are arranged on a substrate 504 such as a sheet of holographic film into a grid 506 of "N" "pixel" regions.

Figure 6:
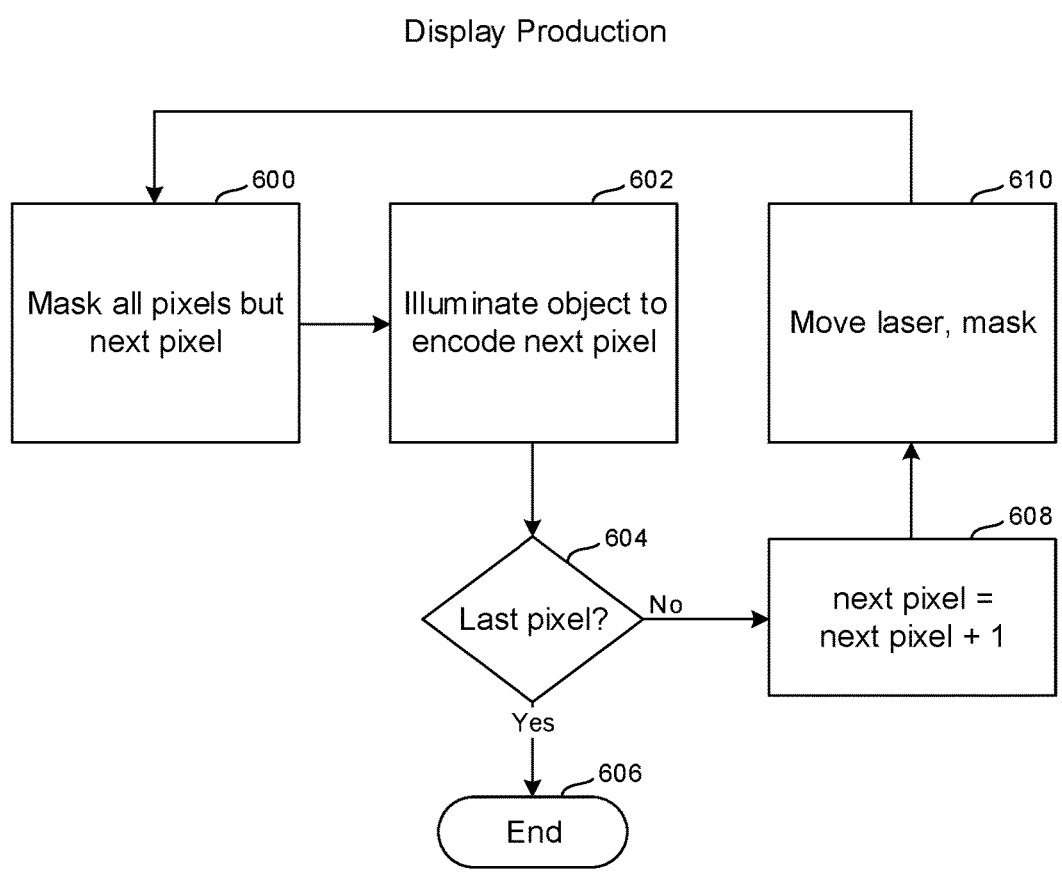
FIG. 6 is a flow chart of example logic used to encode holographic film on a pixel-by-pixel basis to produce a display.

FIG. 6 shows example logic for establishing a display based on holographic film according to embodiments above, and in particular the embodiments shown in FIGS. 2 and 3. Commencing at state 600, at least the regions of the holographic film nearby the region sought to be encoded and in some embodiments all regions of the holographic film except the region sought to be encoded are masked. Then, at block 602 the appropriate reflector(s) are irradiated by the laser assembly and the resulting object beam from the reflector interferes with the reference beam at the region sought to be encoded, encoding the region with a holographic image of the reflector. The encoded region effectively establishes one pixel of the display.

If the last region (pixel) of the film has been encoded at diamond 604, the logic ends at state 606, but otherwise the next region (pixel) of the film to be encoded is identified at block 608. The encoding laser is then moved, and if desired the mask(s) are moved and when necessary the reflector(s) are moved at block 610. The logic loops back to block 600 to mask regions except the region to be encoded, which is encoded at block 602. The logic loops until all regions (pixels) of the holographic film are encoded with their own individual holograms.

Note that polarization and multiple exposures to each pixel region may be executed for recording a series of two dimensional planes that are superimposed on each other in the holographic film. In this way a 3D volumetric display may be made or simulated. Lenses may be used to vary the virtual image depth at which a 2D plane is recorded. During replay, the replay laser uses the same phase for each pixel as was used to encode the pixel and polarization can be used to select the respective plane from the series of planes recorded in the film.

Figure 7:
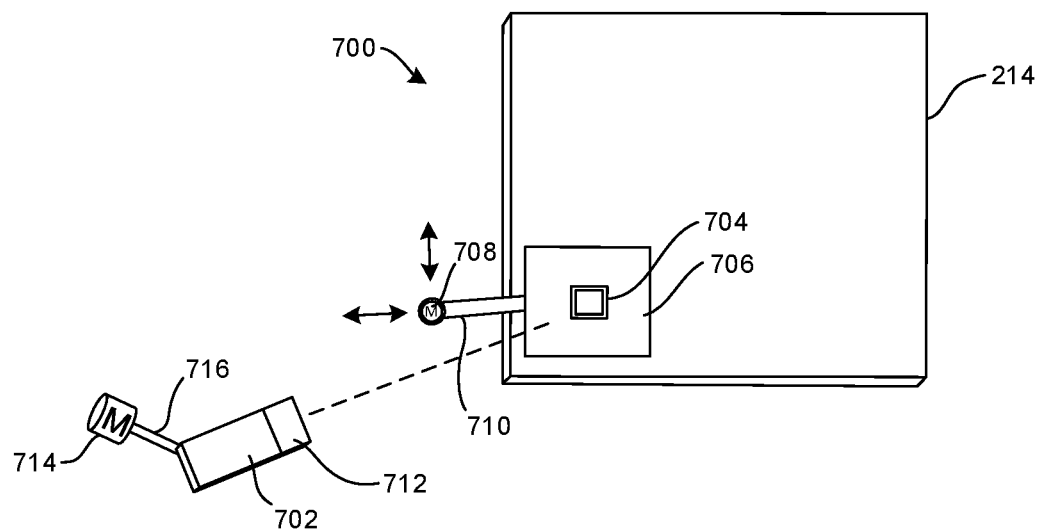
FIG. 7 is a schematic diagram of a first architecture for playing back demanded images on a holographic film display.

FIG. 7 shows a first system 700 for playing back demanded images using the holographic film 214 encoded according to any of the example non-limiting techniques above. Note that while the pixels of the film 214 are each encoded with their own respective hologram as described above, the demanded images to be presented using the film 214 as a display are not the images of the reflectors or other objects used to encode the film. Instead, the demanded images, typically video frames, may be any video images from, e.g., televised video programming, computer games, motion pictures as may be shown in theaters, etc.

A dynamic illuminator, which in the example of FIG. 7 includes at least one scanner, 702 illuminates pixel regions 704, one pixel at a time, of the film 214. The scanner 702 may be one or more laser(s) or LEDs including red, green, and blue emitters for simultaneous or sequential illumination of each pixel with the standard colors. An optional mask 706 may be used to mask regions of the film 214 that are not to be illuminated. The mask 706 may be moved in one, two, or three dimensions by one or more motors 708 engaged with the mask through one or more couplings 710. In the below-discussed example of FIG. 13 the mask may be omitted and a static polarization array filter is disposed adjacent the film to reduce cross talk.

The scanner 702 may emit light through one or more polarizers 712 such as dynamic polarizers, and may be moved in one, two, or three dimensions by a motor 714 engaged with the scanner 702 by one or more couplings 716.

Figure 8:
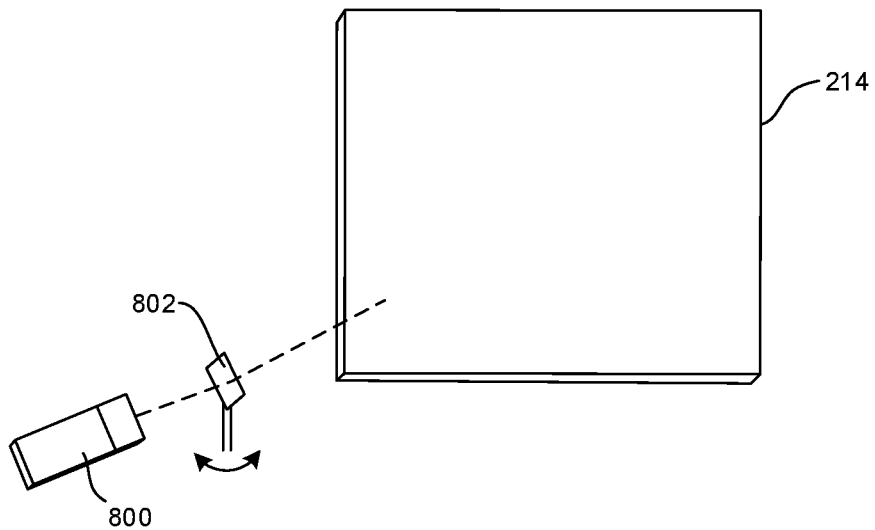
FIG. 8 is a schematic diagram of a second architecture for playing back demanded images on a holographic film display.

FIG. 8 shows an alternate embodiment in which instead of moving an illuminator 800, a dynamic illuminator may include a dynamic reflective element or array of elements 802 that receive light from the illuminator 800. For example, the illuminator 800 may be a laser that illuminates a liquid crystal on silicon (LCOS) reflective display. Thus, the dynamic illuminator may include an illuminating laser and a dynamic array of reflective or diffraction elements. The dynamic array of reflective or diffraction elements may be established by a liquid crystal on silicon (LCOS) reflective display or a LCOS transmissive display. Or, the dynamic illuminator may include one or more scanning mirrors such as but not limited to micro electrical-mechanical (MEMS) devices may be used to scan the light from the illuminator 800 onto successive pixel regions of the film 214. Mask(s) and Polarization filters may be used in FIG. 8 similar to their use in FIG. 7.

Figure 9:
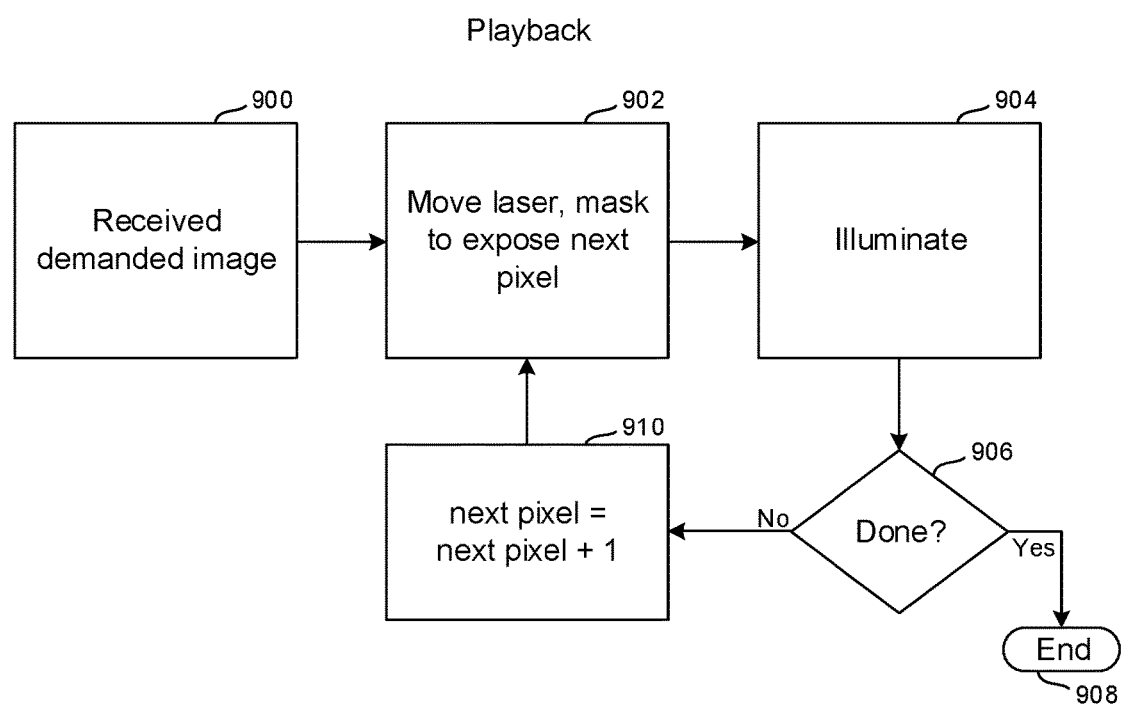
FIG. 9 is a flow chart of example logic for playing back a demanded image on a holographic film display.

FIG. 9 illustrates example playback logic. The demanded image is received at block 900. Typically, a demanded image includes, among other things, values of individual pixel illumination to be established. Proceeding to block 902, for the next pixel to be illuminated, nearby (or all other) pixel regions may be masked and the scanner moved as appropriate (e.g., in one or more of position relative to the film orientation relative to the film, and polarization) to illuminate the next pixel illuminated to block 904. If all pixels have been illuminated according to the demanded image at diamond 906, the process ends at state 908, where a next demanded image typically is retrieved for imaging.

On the other hand, when all pixels have not been illuminated according to the demanded image at diamond 906, the process proceeds to block 910 to retrieve the next pixel (programmatically, increments the "next pixel"). The logic then returns to block 902, continuing to loop until the demanded image has been produced on the holographic film 214.

Figure 10:
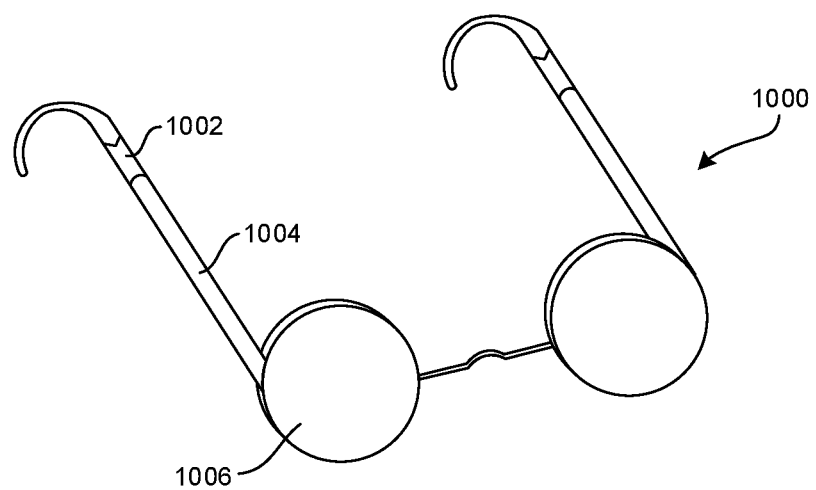
FIG. 10 is a diagram of a glasses-type head wearable device that can incorporate the dynamic holographic film display.
Figure 11:
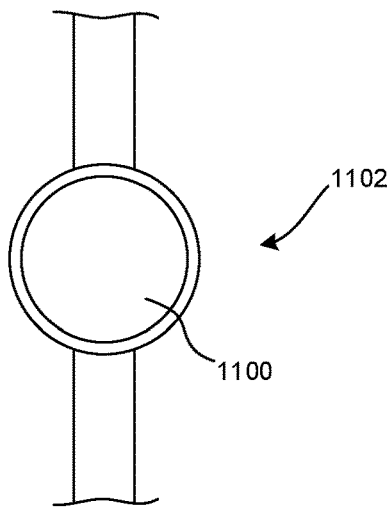
FIG. 11 is a diagram of a wristwatch-type head wearable device that can incorporate the dynamic holographic film display.
Figure 12:
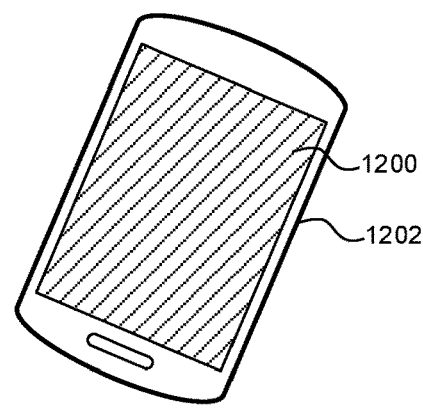
FIG. 12 is a diagram of a mobile phone that can incorporate the dynamic holographic film display.

For playback, the holographically recorded film may be implemented in a VR or AR headset such as the one shown in FIG. 1 and described above. Or, the film may be implemented by an eyeglasses-type frame 1000 (FIG. 10). A laser 1002 may be mounted in the frame and a light pipe 1004 may be used to direct laser light onto glasses-type displays 1006. Yet again, the film can be implemented as a display face 1100 in a wristwatch 1102 (FIG. 11), the display 1200 of a mobile phone 1202 (FIG. 12), or as a display in any of the example devices shown in, e.g., FIG. 1, including, without limitation, TVs, monitors, tablet computers, projectors, and projection films.

Figure 13:
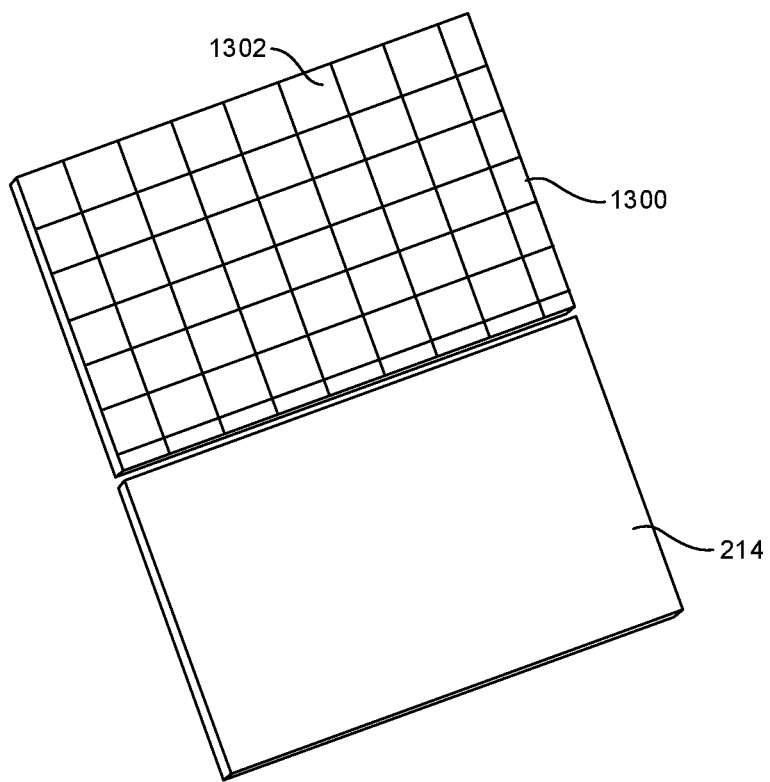
FIG. 13 is an exploded perspective view of holographic film overlaid with a static polarizer for encoding and/or playback.

FIG. 13 shows, in exploded view, the film 214 overlaid with a statically alternating polarization filter array 1300 to reduce cross-talk. It is to be understood that array 1300 can be placed flush against the film or closely spaced from the film.

As shown, the array 1300 can be a grid-like array of individual polarization filter regions 1302 in a checkerboard pattern over respective pixel regions of the film 214 to reduce cross-talk with neighboring pixels. The static polarization filter array 1300 can be placed on the film 214 for recording and playback. The polarization of the regions 1302 alternate from region to region, so that a region has a different polarization than the polarizations of immediately adjacent regions. A dynamic polarizer, as discussed above, can be engaged with on the laser source for recording and on a laser/LED for playback.

Figure 14:
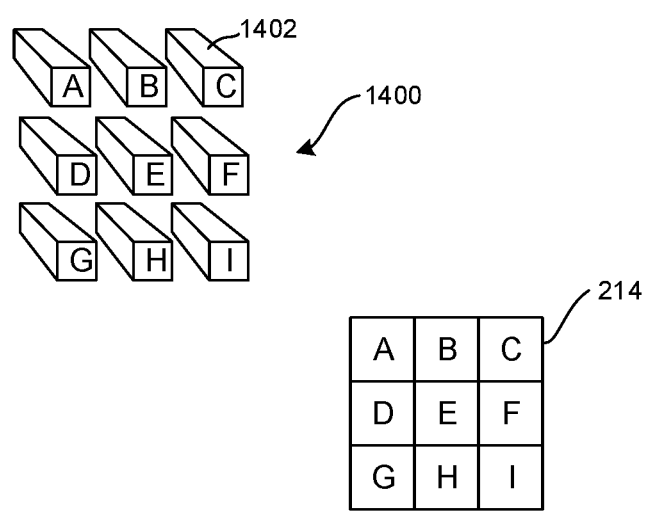
FIG. 14 is a schematic diagram of a playback system with a grid-like arrangement of laser or LED illuminators.

FIG. 14 shows a playback arrangement (with polarization filters and other components discussed above removed for clarity) in which a dynamic illuminator may include an array 1400 of illuminators 1402 such as lasers (for transmissive or reflective film) or LEDs (for reflective film) is provided to illuminate the pixels of the film 214. In the example shown, there is a one-to-one correspondence between the illuminators 1402 in the array 1400 and the pixels of the film, indicated by showing nine pixels in the film labeled A, B, C, D, E, F, G, H, and I and labeling nine respective illuminators 1402 A, B, C, D, E, F, G, H, and I to indicate the correspondence. The illuminators 1402 need not be movable since each illuminator illuminates only one respective pixel. Note that more illuminators than pixels may be provided such that the array 1400 may include one set for Red, one for Green and one for Blue to simultaneously or sequentially produce full color.

The laser assemblies shown and described herein may include one or more of the processors, computer media, and other components as appropriate shown in the figures and described herein. The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A method comprising:
   receiving signals representing a demanded image;
   directing light from at least one laser onto holographic film having holographically recorded pixels one pixel at a time such that perceptible reflections of the light from the film establish a presentation in accordance with the demanded image;
   closely juxtaposing an array of static polarization regions with the film prior to the directing;
   wherein at least one characteristic of the at least one laser is modified between directing light onto successive first and second pixels, wherein the at least one characteristic includes polarization of the at least one laser.

2. The method of claim 1, wherein the directing step comprises:
   directing light from at least one scanner against a first pixel; and
   after directing light against the first pixel, directing light from east one scanner against a second pixel.

3. The method of claim 2, comprising:
  altering the at least one scanner and/or changing a polarity of the at least one scanner between directing light against the first pixel and directing light against the second pixel.

4. The method of claim 2, wherein the at least one scanner comprises at least one laser.

5. The method of claim 2, wherein the at least one scanner comprises at least one light emitting diode (LED).

6. The method of claim 2, wherein the at least one scanner comprises an array of scanners, each scanner in the array of scanners for illuminating a respective holographically recorded pixel in the film.

7. The method of claim 2, comprising passing light from the at least one scanner through a dynamic polarizer.

8. The method of claim 1, comprising:
  masking all pixels from the light except for a first pixel for illuminating the first pixel; and
  masking all pixels from the light except for a second pixel for illuminating the second pixel.

9. The method of claim 1, comprising providing the holographic film in at least one head-wearable mount.

10. The method of claim 9, wherein the head-wearable mount is selected from the group consisting of: an eyeglasses frame, a virtual reality (VR) headset, an augmented reality (AR) headset.

\* \* \* \* \*